3,733,219
LOW IMPACT ENERGY ELECTROCHEMICAL
CELLS AND BATTERIES
Jean-Pierre Courtot, Pantin, France, assignor to Societe des Accummulateurs Fixes et de Traction (Societe Anonyme), Romainville, France
Filed Feb. 22, 1971, Ser. No. 117,433
Claims priority, application France, Feb. 27, 1970, 7007205
Int. Cl. H01m *35/16, 5/00*
U.S. Cl. 136—13      3 Claims

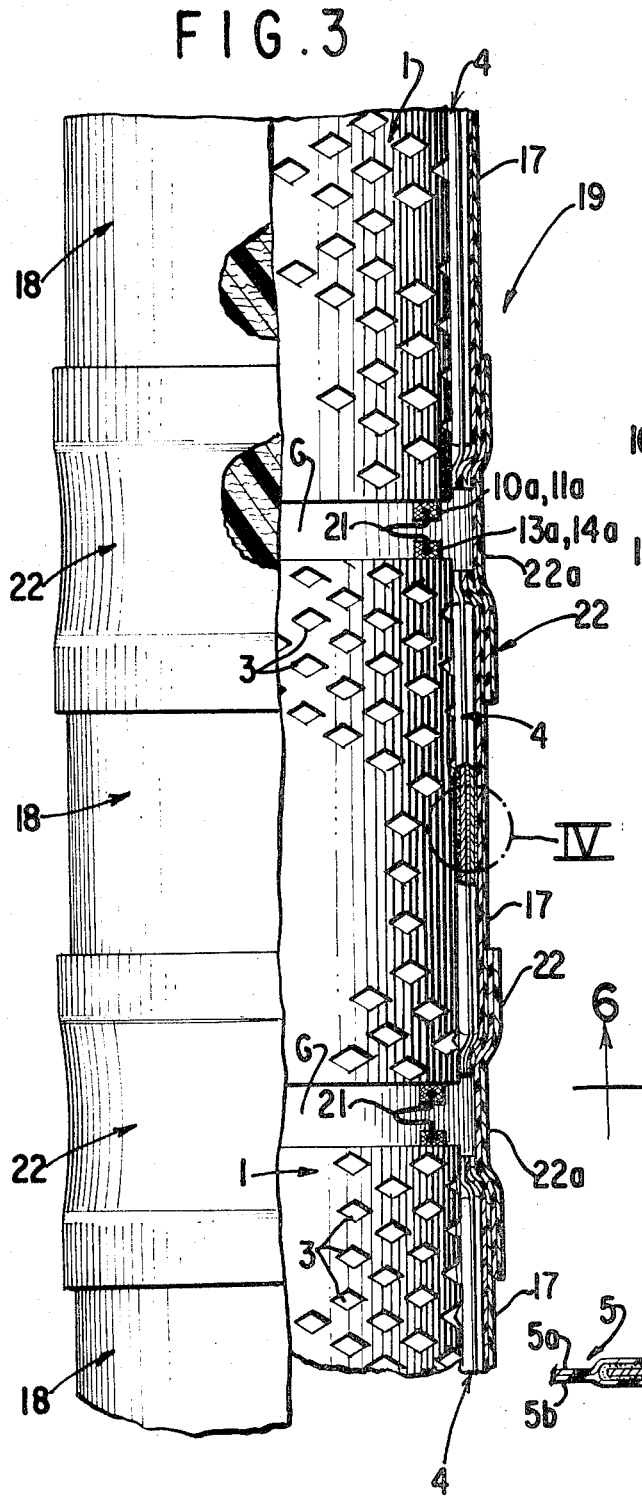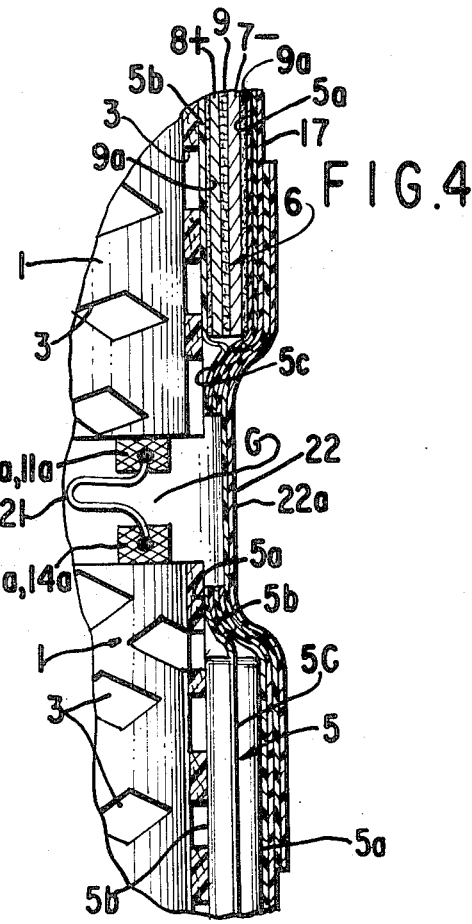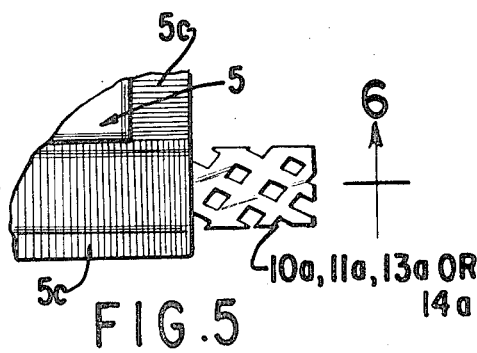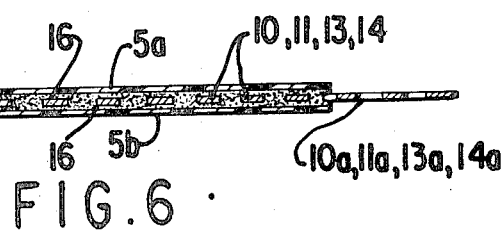

ABSTRACT OF THE DISCLOSURE

Electrochemical cells and batteries of low collision impact energy for use in high altitude testing equipment such as sounding balloons to reduce to the negligible the danger of impact damage to aircraft colliding therewith. Individual cells include flexible bands of opposite polarity electrodes, interposed separators and electrolyte all enclosed in a flexible sealed envelope with leads from the respective opposite polarity electrodes projecting in sealed relationship from the envelope. Each envelope with its contents is wrapped around a rigid tubular grid structure of small mass and having small meshes. The envelope is secured in place on the grid structure by flexible reinforced tape. Groups of such individual cells are positioned in axial spaced-apart alignment with appropriate long lead interconnection of cell terminals to form a battery. Adjacent cells are maintained together in assembled relationship with gaps between adjacent cells by reinforced flexible tape bindings.

BACKGROUND OF INVENTION

Electrochemical generators and cells of low impact energy for use particularly in high altitude travelling apparatus such as weather forecasting and sounding balloons to minimize impact collision damage to high speed aircraft likely to collide therewith have already been proposed in the prior art, for example, in U.S. Pat. No. 3,451,850 of June 24, 1969 entitled Electrochemical Generator of Low Collision Impact Energy.

In that patent, cells and batteries are disclosed intended to minimize shock and impact damage to the aircraft by reduction of cell and battery masses as much as possible. To this end in that patent, the battery comprises an assembly of axially internested cell units, each cell unit comprising a sealed flexible envelope containing as a group a stack of a small number of flexible electrode plates or bands of opposite polarity with interposed separators, and requisite electrolyte, the electrode and separator bands being arranged so as to present a large apparent surface area in relation to their volume. Such cell units are each wrapped around a hollow relatively rigid spool of low density material such as polyurethane foam or polyethylene foam, being held in place thereon either by a rigid outer cylinder of similar synthetic foam material or by a resistant flexible strip, both being designed to maintain the electrode and separator components within the envelope pressed into close contact and hold such unit firmly on the spool, thus providing an electrochemical cell. Opposite ends of each spool are provided respectively with a complementary projecting annular part and a recess so that groups of such spools each bearing a cell unit thereon may be assembled in axially aligned and internested relationship, their respective cell units being interconnected to provide a low mass battery of low impact energy for suspension from the balloon.

However, with arrangements of this known type it has been found that on occurrence of a collision between aircraft flying at high speed and a battery of such known construction, the mass involved in the impact at collision could involve more cells of the battery than the ones directly struck since the spools bearing such cell units are joined together by their internesting ends. As a result, because more than the mass of the directly struck cell units is involved the extent of resultant damage to the colliding aircraft is unnecessarily large.

The present invention has for a principal object the provision of low impact energy cells and batteries whose structure provides for considerably greater minimization of battery and cell masses involved in the impact at collision with consequent less possibility of harmful damage to the colliding high speed aircraft, and aims further at simplification of cell manufacturing procedure as well as procedure in the assembly of such cells into batteries, thus also reducing costs of manufacture.

SUMMARY OF INVENTION

In effecting these objects, the invention comprises provision of cells of low impact energy of the type comprising sealed envelopes containing electrolyte and as a stack a relatively small number of alternately superposed flexible electrode bands of opposite polarity with interposed separators arranged so that they present a large apparent surface relative to their volumes, each such sealed envelope and its contents constituting a cell unit, each such envelope and its contents being mounted as a wrapping on an individual rigid tubular shaped support of grid-like structure made preferably of light weight synthetic material, each such unit being maintained in wrapped condition about its grid-like support as by a reinforced flexible, environment-resistant, stretched tape mounted around the envelope, said tape serving also to maintain the electrode bands and separators within the enclosing envelope pressed closely together.

The height of each grid-like support is slightly larger than the width of the enclosing envelope containing the electrolyte, electrodes and separators.

Preferably, in order to provide suitable rigidity to the tubular grid supports, glass fibers or other equivalent reinforcing material are incorporated into the synthetic material thereof.

In addition, the meshes of the grid of the supports must not be of too large a size so that any gas pressure as may build up internally of the cells, especially during their charging will not cause the wall of the envelope resting on the grid support to bulge through its meshes.

For illustrative purposes, but not as a limitation, the meshes may be diamond-shaped with sides respectively 2 to 5 mm. long, the angles between two sides being between 45° and 135°.

As a further feature of the invention, a battery of such cells is assembled by binding together a group of axially aligned cells by flexible, preferably reinforced mechanically resistant and stretched tape binding which surrounds adjoining end portions of the cylindrical supports of two adjacent cells, a gap being maintained by the tape between adjoining ends of the tubular grid structures of said adjacent cells.

Advantageously, this flexible tape binding is of the same nature as that serving to maintain the envelope of an individual cell on its tubular grid-like support.

This flexible tape binding may be of fabric or of a longitudinally reinforced plastic material having an adhesive face and which is mechanically resistant.

In a battery constructed as thus described, in the event of collision with an aircraft flying at high speed, the mass of the directly struck cells is practically the only one involved since flexible links provided by the joining tape bindings exist between adjacent cells of the battery.

In addition, because each cylindrical support is a grid structure, it may have a high vacancy or void ratio, e.g. of about 50% so that the mass of each cell involved in the collision impact is still further lessened.

Other objects, features and characteristics of the invention will become apparent from the following detailed description and the accompanying drawings forming part hereof.

DRAWINGS

In the drawings, FIG. 1 is a perspective view of a cylindrically shaped support comprised in a cell embodying the invention;

FIG. 3 is a partially sectionalized elevational view of a portion of a battery of cells embodying the invention;

FIG. 4 is a fragmentary sectional view on a magnified scale including details encircled at IV in FIG. 3;

FIG. 5 is a fragmentary detail illustrating structure of a terminal connection protruding from an electrode within the sealed envelope of FIG. 2; and FIG. 6 is a sectional view taken along lines 6—6 of FIG 5.

DETAILED DESCRIPTION

Figure 1:
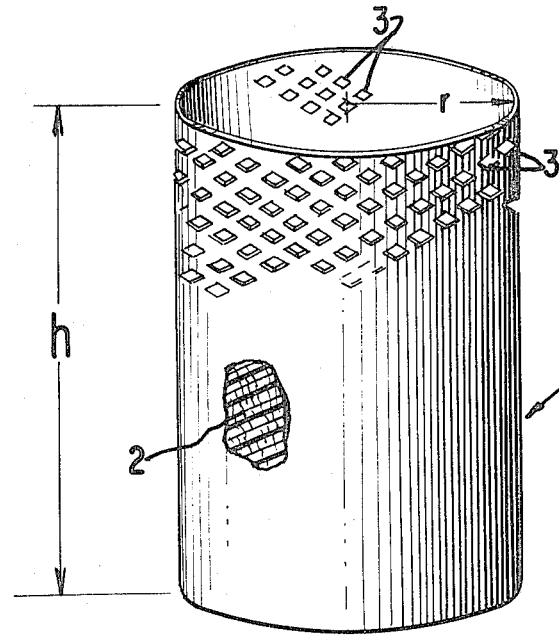

Referring first to FIG. 1, the reference character 1 denotes a tubular grid support 1 made preferably of light weight, strong synthetic plastic material such as an epoxy resin or other environment resistant material capable also of withstanding low temperatures usually prevalent at high altitudes, reinforced as by incorporated glass fibers 2 to provide rigidity and strength. Preferably, the tubular grid support is uniformly cylindrical and is open at both its ends. The meshes 3 of the grid support 1 are relatively small, and in the embodiment shown are diamond shaped, their diagonals being respectively of the order of 3 and 5 mm. in length, with sides respectively 2 to 5 mm. in length and angles between two sides comprised between 45° and 135°. The meshes 3 for purposes as will hereinafter become apparent must have relatively small area. While diamond shaped meshes are shown, they may, if desired have other suitable shapes with similarity small areal dimensions.

Figure 2:
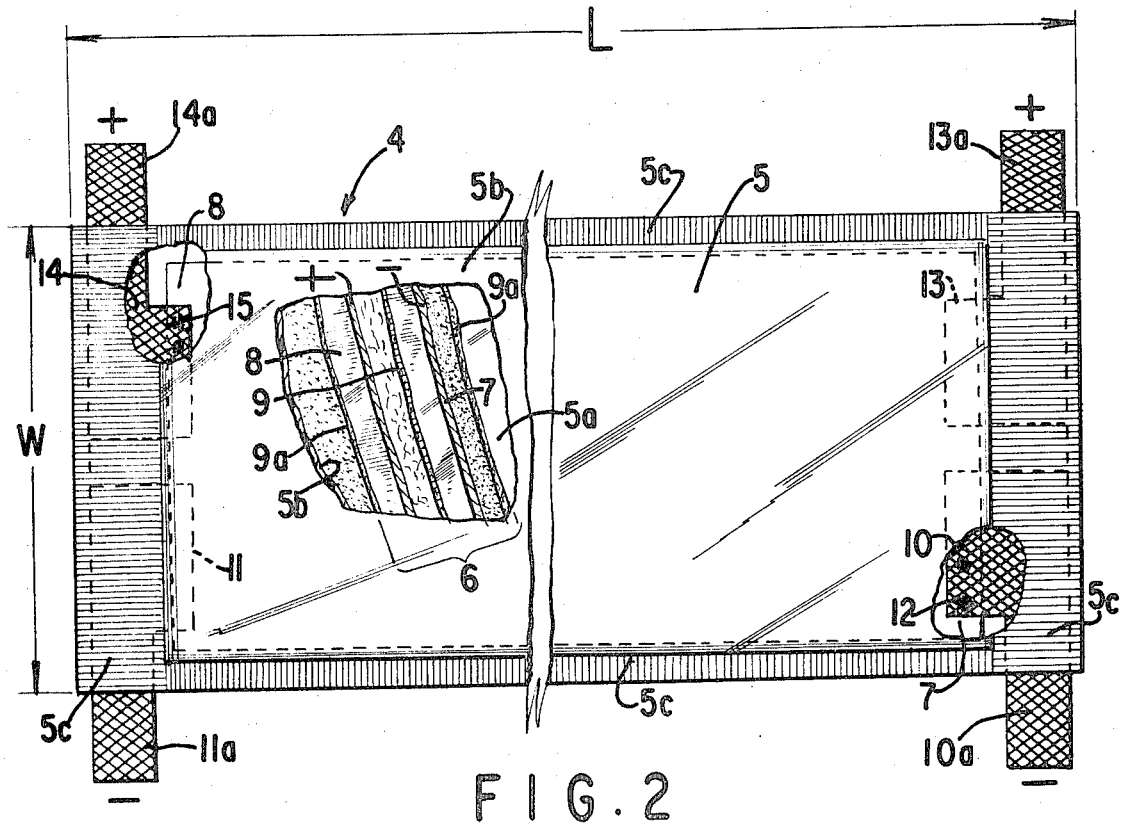
FIG. 2 is a partially broken away elevational view of the stack of electrode and separator strips housed in their sealed envelope.

Each such grid support 1 serves as a carrier for a cell unit 4 which is initially of generally flat rectangular form as seen in FIG. 2 and which subsequently is wrapped about a grid support 1 and secured thereon as will be presently described.

Each cell unit 4 may have a construction similar to that described in the above-mentioned Pat. 3,451,850. In particular herein, each such cell unit 4 comprises a sealed envelope 5 formed of two sheets 5a and 5b (see FIG. 4) of easily weldable plastic material such as a polyamid marketed under the trademark "Rilsan," being joined along their peripheries as by welding at 5c or in other suitable manner to form sealed envelope 5 that encloses all contents of the cell unit 4.

The contents of the envelope 5 comprise generally a stack 6 of alternately superposed flexible negative electrode strips or bands 7 and flexible positive strips or bands 8 with bands or strips of conventional, preferably bibulous separator material 9 interleaved between adjacent positive and negative electrode strips, as well as a band or strip of like separator material 9a on each of the external faces of the two outermost electrode strips of the stack 6. In one embodiment, if the cell 4 is of the nickel-cadmium type, each negative electrode strip 7 may comprise a conventional sintered porous nickel carrier bearing conventional negative active material, and each positive electrode strip 8 may comprise a conventional sintered porous metal carrier bearing conventional positive active material. In some cells, there may be one more negative electrode strip 7 than there are positive electrode strips 8 in the stack 6. The separator material strips may have imbibed conventional alkaline electrolyte serving thus also as storage means for the electrolyte required in the cell unit 4.

Each negative electrode 7 has a pair of spaced-apart conductive terminal members or connectors 10 and 11 electrically connected as by welding or soldering at 12 to said electrode 7 respectively adjacent its opposite end edge portions. These terminal members 10 and 11 are provided respectively with tabs 10a and 11a projecting laterally from one side edge of said electrode 7. Similarly, each positive electrode 8 has a pair of spaced-apart terminal members or connectors 13 and 14 electrically connected as by welding or soldering at 15 to said electrode 8 adjacent its opposite end edge portions. These terminal members 13 and 14 are provided respectively with tabs 13a and 14a projecting laterally from that side edge of electrode 8 which is opposite to the side edge of electrode 7 from which tabs 10a and 11a project. These terminal members 10, 11, 13 and 14 are of flexible metal, for example, of expanded metal and portions thereof are sealed into peripheral portions 5c of envelope 5 and their respective pairs of tabs 10a, 11a and 13, 14a are dimensioned to protrude outwardly in opposite directions from the longitudinal side edges of the sealed envelope 5 as is seen in FIG. 2, the longitudinal spacing distance between the tabs of each pair of such tabs being such that when the envelope is mounted on the grid support 1, as will be described, each tab of each pair is in substantially contiguous or juxtaposed relationship to the other tab of such pair.

In order to enhance the sealing relationship between the portions of the terminal members and the sealed peripheral portions 5c of the envelope 5, the portions of the said terminal members 10, 11, 13 and 14 which are to become encompassed in the sealed borders 5c of the envelope sheets 5a and 5b, are heat sealed in thin strips 16 (FIG. 6) preferably of the same synthetic material as the material of envelope sheets 5a and 5b. The heat sealing application of these strips 16 to said portions of said terminals or connectors may be effected prior to welded heat sealing of the border 5c of the plastic sheets 5a and 5b to form the enclosing sealed envelope 5. This procedure insures a better hermetic sealing relationship between the terminal members and the envelope in the regions of their extension through said borders 5c.

After formation of stack 6 and the completion of its sealed enclosure in envelope 5 to constitute the flexible cell unit 4, this flexible unit is bent and mounted around a grid support 1. The overall width w of the envelope 5 of the cell unit 4 is preferably slightly less than the axial height h of the grid support 1. Its length L is equal approximately to $2\pi r$, r being the radius of the cylindrical grid support 1.

In mounting this cell unit 4 on said grid support 1, it is centralized relative to the ends of said support and wound or bent around the cylindrical grid surface thereof and in intimate contact with said surface, the pair of negative tabs 10a, 11a then projecting axially beyond one end of said support 1, and the pair of positive tabs 13a, 14a projecting axially beyond the opposite end of said support 1 as seen in FIGS. 3 and 4. At this time, too, the two negative tabs 10a and 11a lie close together or in superposed relationship and similarly the two negative tabs 13a and 14a lie close together or in superposed relationship.

After bending or winding of the flexible cell unit 4 around said grid support and centering it, it is secured permanently in place on the grid support 1 in a manner similar to that described in the said Pat. 3,451,850 as by winding one or two turns of a flexible, mechanically-resistant stretched tape 17 around the wound cell unit 4 borne on support 1. This tape may, for example, be of plastic material advantageously reinforced as by glass fibers and having an adhesive coating on the face thereof applied to the wound cell unit 4. During winding, this tape 17 around the cell unit 4, it is stretched tightly so as to tightly press the inner envelope sheet 5b against the cylindrical surface of the grid support 1 and also then serves to press the electrode bands and separators within the envelope 5 closely together as is conventionally required for good cell operation. This completes a desired cell component 18 for the desired low impact energy battery 19 that is to be suspended from the high altitude balloon to operate its test equipment.

By way of example, but not limitatively dimensional characteristics may be as follows:

Height h of grid support 1 is approximately 90 mm.; radius r of grid support 1 is as suitable; overall length L of the envelope 5 of cell unit 4 is approximately $2\pi r$; and width w of cell unit 4 is approximately 88 mm.

A battery 19 comprising an axially aligned assembly of a selected number of like axially spaced-apart cell components 18 is then constructed as is illustrated in FIGS. 4 and 5.

A first cell component 18 with its negative connector tabs 10a, 11a projecting downwardly is aligned axially with a second cell component 18 whose positive tabs 13a, 14a project upwardly in aligned relationship with said negative tabs 10a and 11a, a selected gap G being provided between facing ends of the aligned cell components. In the embodiment shown, but without limitation, the axial gap space between facing ends of the two cell components 18 may be of the order of 10 mm. The pair of negative connector tabs 10a, 11a of the first cell component 18 are then electrically connected to the pair of positive connector tabs of the second cell component 18 as by a flexible wire lead 21 of substantially greater length than the length of the gap G, opposite ends of said wire lead 21 being welded or soldered to the respective pairs of tabs 10a, 11a and 13a, 14a. Then, while maintaining the aforesaid gap G between the two axially aligned cell components 18, they are bound in this relationship by wrapping one or two turns of a flexible, mechanically-resistant preferably fiber reinforced and stretched tape 22 around adjacent end portions of the two cell units. This second tape 22 in the embodiment shown has a width of approximately 50 mm. and is preferably of the same material as tape 17 thus providing good adherence of the adhesive-bearing face of the second tape 22 to the outer surfaces of the tapes 17 of the pair of thus united cell components 18. The tape 22 is stretched tightly during winding and conforms itself to the outer contours of the joined cell components 18 also being partially reentrant at 22a in the region of the gap G between said cell components. The spacing provided by gap G between said cell components, the flexibility or resiliency of tape 22, and the greater length of connecting lead or wire 21 than the length of the gap G provide a highly flexible joint between the two cell components 18. Additional cell components are joined axially and in like manner in seriatim from the second cell component 18 to the desired number to form the battery 19 of axially aligned series connected cell components 18 each flexibly joined to its adjacent cell component. The tapes 17 and 22 are of very small thickness, the showings thereof having been exaggerated in the drawnigs for clarity.

Because of the gaps G provided in the battery 19 between neighboring cell components and the flexible tapes 22 binding them together as well as the excess lengths of connecting lead wires 21, the joints between the cells provide substantial flexibility and allow for relative shifting of individual cell components 18 of the battery 19. As a consequence on occurence of a collision between an aircraft flying at high speed with a battery 19 embodying the invention as borne, for example, by a sounding balloon, only the relatively light mass of the directly struck cell components 18 will be the ones involved in the accident. As a result possible damage to the colliding aircraft is minimized to the utmost extent. The small size of the meshes 3 prevents the envelope 5 from bulging through said meshes.

An additional advantage of the invention is that a materially simpler cell component structure and simplified assembly procedure result by practicing this invention with consequent reduction in manufacturing costs.

While a specific embodiment of the invention has been described and illustrated herein, variations in structural detail and in structural procedure within the scope of the appended claims are possible and are contemplated. There is no intention of limitation to the exact disclosure herein presented.

What is claimed is:

1. A battery of the type comprising a plurality of electrochemical cell components of low collision impact energy, each cell component comprising a rigid grid support of low specific density and having mesh openings of small area, a sealed electrochemical generator unit wrapped externally around and mounted on said grid support and surrounding retaining tape means wound tightly about said unit and adhered thereto to retain such unit in place on said grid support and also to maintain internal elements of said unit pressed closely together, said cell components being axially aligned with a gap between adjoining ends of adjacent cell components, flexible mechanically resistant, stretched tape means surrounding and adhered to adjoining gap-separated end portions of each pair of adjacent cell components to provide a flexible juncture between said pair of cell components while maintaining said gap therebetween, and flexible electrical connecting means of greater length than said gap located in the gap for electrically interconnecting said cell components to form said battery.

2. A battery according to claim 1 wherein each said tape means is of plastic material bearing fibrous reinforcement.

3. A battery according to claim 2 where said fibrous reinforcement constitutes glass fibers.

References Cited
UNITED STATES PATENTS

| | | | |
|---|---|---|---|
| 3,451,850 | 6/1969 | Du Plessix | 136—6 |
| 2,747,007 | 5/1956 | Brandt | 136—14 |
| 3,202,545 | 8/1965 | Emeriat | 136—38 |
| 1,161,668 | 11/1915 | Heinrich et al. | 136—110 |
| 3,064,069 | 11/1962 | Auge | 136—173 |
| 3,080,445 | 3/1963 | Brown | 136—111 |
| 3,353,999 | 11/1967 | Osborn | 136—83 |
| 3,375,136 | 3/1968 | Biggar | 136—6 |
| 2,346,695 | 4/1944 | Miller | 136—173 |

ANTHONY SKAPARS, Primary Examiner

U.S. Cl. X.R.

136—132, 135 R